(12) United States Patent
Fromentin

(10) Patent No.: US 10,370,520 B2
(45) Date of Patent: Aug. 6, 2019

(54) COMPOSITION FOR THE MANUFACTURE OF AN OPHTHALMIC LENS COMPRISING AN UV-ABSORBER AND AN ANTI-YELLOWING ADDITIVE

(71) Applicant: ESSILOR INTERNATIONAL (COMPAGNIE GENERALE D'OPTIQUE), Charenton le Pont (FR)

(72) Inventor: Pierre Fromentin, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 133 days.

(21) Appl. No.: 15/319,260

(22) PCT Filed: Jun. 23, 2015

(86) PCT No.: PCT/EP2015/064156
§ 371 (c)(1),
(2) Date: Dec. 15, 2016

(87) PCT Pub. No.: WO2015/197649
PCT Pub. Date: Dec. 30, 2015

(65) Prior Publication Data
US 2017/0121498 A1 May 4, 2017

(30) Foreign Application Priority Data
Jun. 24, 2014 (EP) .................................... 14305987

(51) Int. Cl.
*G02B 1/04* (2006.01)
*C08K 5/3435* (2006.01)
*C08K 5/3475* (2006.01)
*C08K 5/3492* (2006.01)
*C08K 5/372* (2006.01)

(52) U.S. Cl.
CPC .......... *C08K 5/3435* (2013.01); *C08K 5/3475* (2013.01); *C08K 5/34926* (2013.01); *C08K 5/372* (2013.01); *G02B 1/041* (2013.01)

(58) Field of Classification Search
CPC ...................................................... G02B 1/041
See application file for complete search history.

(56) References Cited

U.S. PATENT DOCUMENTS 6,740,721 B2 * 5/2004 Ooga .................. C08F 16/18
524/147

FOREIGN PATENT DOCUMENTS

JP 2003066201 3/2003
JP 2013184996 9/2013

* cited by examiner

*Primary Examiner* — Michael F Pepitone
(74) *Attorney, Agent, or Firm* — Norton Rose Fulbright US LLP

(57) ABSTRACT

The present invention relates to a thermosetting composition for the manufacture of an ophthalmic lens which efficiently absorbs ultraviolet (UV) rays without exhibiting undesirable yellowing, said composition comprising an allyl monomer or oligomer, a catalyst, a UV-absorber and a specific anti-yellowing additive. The present invention also relates to the use of said composition and to the ophthalmic lens obtained from said composition.

20 Claims, 1 Drawing Sheet

COMPOSITION FOR THE MANUFACTURE OF AN OPHTHALMIC LENS COMPRISING AN UV-ABSORBER AND AN ANTI-YELLOWING ADDITIVE

CROSS-REFERENCE TO RELATED APPLICATIONS

This application is a national phase application under 35 U.S.C. § 371 of International Application No. PCT/EP2015/064156 filed 23 Jun. 2015, which claims priority to European Patent Application No. 14305987.1 filed 24 Jun. 2014. The entire contents of each of the above-referenced disclosures is specifically incorporated by reference herein without disclaimer.

TECHNICAL FIELD

The present invention relates to a thermosetting composition for the manufacture of an ophthalmic lens which efficiently absorbs ultraviolet (UV) rays without exhibiting undesirable yellowing, said composition comprising an allyl monomer or oligomer, a catalyst, a UV-absorber and a specific anti-yellowing additive. The present invention also relates to the use of said composition and to the ophthalmic lens obtained from said composition.

BACKGROUND OF THE INVENTION

UV rays having a wavelength between 200 and 380 nm are known to be harmful to the human eye. In particular, they can accelerate ocular ageing which can lead to an early cataract or to more extreme disorders such as photokeratitis or "snow blindness", These damages can be prevented by incorporating UV-absorbers in ophthalmic lenses.

Three different methods can be used to prepare UV-absorbing ophthalmic lenses. The first method is the impregnation of a polymerized lens in a bath containing a UV-absorber as disclosed in European patent No 1 085 349. However, this method adds a step to the production process of the lens, which is not desirable in terms of cost and time.

The second method is the coating of a substance capable of absorbing UV rays onto the surface of ophthalmic lenses as disclosed in U.S. Pat. No. 5,949,518. However, the incorporation of high amounts of UV-absorbers in a coating weakens its mechanical properties.

The third method is the incorporation of a UV-absorber in the bulk liquid formulation (i.e. before polymerization) as taught in European patent No 1 085 348. In this document, a thermosetting composition comprising a diethylene glycol bisallylcarbonate or bis(β-epithiopropyl)sulfide monomer, diisopropyl peroxydicarbonate as a catalyst and 2-(2-hydroxy-4-octyloxyphenyl)-benzotriazole as a UV-absorber is cast into a mold for lenses and heated until polymerized. However, this method is unable to provide a lens that can both efficiently absorb UV rays and that does not exhibit undesirable yellowing.

Yellowing of the lens, as measured by the yellow index, can be caused by two degradation mechanisms:
- during polymerization, interaction between radicals and UV absorber generates a yellowing effect which is particularly apparent when high concentrations of catalysts are used to initiate polymerization, especially with monomers having weak reactivity such as allyl monomers;
- during ageing of the lens, UV rays interact with the polymer matrix and UV absorbers, generating a yellowing effect.

Yellowing of the lens could be prevented if less catalyst were used (which may happen if an additive or impurity reacts quickly with catalyst) but polymerization would not be complete and mechanical properties of lenses would not be acceptable.

European patent application No 2 172 792 mentions that the yellow index of a lens made with a thermosetting composition comprising a UV absorber can be reduced by introducing specific dyes or pigments, namely a cobalt oxide and alumina compound and a nanodispersion of gold particles. However, the preparation process of the lens is complex and the lens obtained with this composition has decreased transmittance or a greyish shade.

There is thus a need for a thermosetting composition that can produce ophthalmic lenses that have a UV cut of 380 nm and a yellow index that is less than 1.5 while at the same time having sufficient transparency.

The Applicant has found that this need could be met by adding a UV absorber and a specific anti-yellowing additive in the thermosetting composition. This specific anti-yellowing additive presents two chemical functions:

Anti-yellowing function. Surprisingly, sulfide or disulfide containing compound, dithiane or trithiane derivatives yield good results. Usually, in the ophthalmic industry, sulphur-containing compounds are known to bring yellow colour to lenses. In this invention though, sulphur compounds provide for less yellow lenses. Piperidine derivatives were also identified as very efficient anti-yellowing additives.

Solubilisation function. A good solubilisation of anti-yellowing additives in monomers is required to avoid defects such as haze or colour unhomogeneity. In allylic monomers used in ophthalmic industry, solubilisation is facilitated when polar groups such as (thio)esters, (thio)carbonates, (thio)carbamates or (thio)amides are present. The number of such polar groups in relationship with the molecular weight of these compounds defines good solubility parameters.

SUMMARY OF THE INVENTION

A first object of this invention is a polymerizable composition for the manufacture of an ophthalmic lens, comprising:
a) at least 20% by weight based on the total weight of the composition of at least one allyl monomer or oligomer selected from diethylene glycol bis(allyl carbonate), ethylene glycol bis(allyl carbonate), oligomers of diethylene glycol bis(allyl carbonate), oligomers of ethylene glycol bis(allyl carbonate) and mixtures thereof,
b) at least one catalyst suitable for initiating the polymerization of said allyl monomer or oligomer,
c) at least one UV absorber,
d) at least one anti-yellowing additive,
wherein said anti-yellowing additive corresponds to general formula (I)

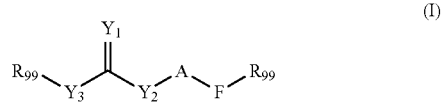

wherein F, A, $Y_3$—$C(Y_1)$—$Y_2$ and $R_{99}$ are as defined herein.

Another object of the present invention is a polymerizable composition for the manufacture of an ophthalmic lens, comprising:
a) at least one allyl monomer or oligomer,
b) at least one catalyst suitable for initiating the polymerization of said allyl monomer or oligomer,
c) at least one UV absorber,
d) at least one anti-yellowing additive selected from:
an ester (di)sulfide anti-yellowing additive having the following formula (XX):

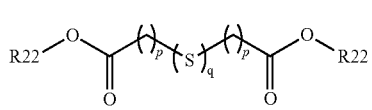

(XX)

wherein R22, p and q are as defined herein; or
a cyclic sulphide having the following formula (XIII):

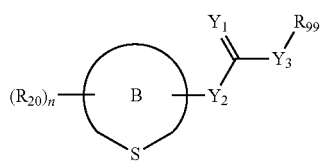

XIII wherein $R_{20}$, n, B, $Y_1$, $Y_2$, $Y_3$ and $R_{99}$ are as defined herein.

Another object of the present invention is the use of the composition according to the invention to manufacture an ophthalmic lens.

Yet another object of the present invention is an ophthalmic lens obtained by filling the composition according to the invention in a mould and then heating it at a temperature of from 75 to 95° C.

It has been shown that the ophthalmic lens obtained according to the invention has a Yellow Index below 2.0 and a variation in the Yellow Index after exposing said lens to UV light for 80 h that does not exceed 0.5 in absolute value, as measured according to the methods described herein. In addition, the mechanical properties of the lens are not degraded by these anti-yellowing additives.

DETAILED DESCRIPTION

Polymerizable Composition

The polymerizable composition according to the invention comprises an allyl monomer or oligomer, a catalyst, a UV-absorber and a specific anti-yellowing additive.

In a first embodiment of the present invention, the polymerizable composition comprises:
a) at least 20% by weight based on the total weight of the composition of at least one allyl monomer or oligomer selected from diethylene glycol bis(allyl carbonate), ethylene glycol bis(allyl carbonate), oligomers of diethylene glycol bis(allyl carbonate), oligomers of ethylene glycol bis(allyl carbonate), and mixtures thereof,
b) at least one catalyst suitable for initiating the polymerization of said allyl compound,
c) at least one UV absorber,
d) at least one anti-yellowing additive, wherein said anti-yellowing additive corresponds to general formula (I):

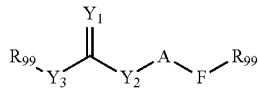

(I)

wherein:
(i) F represents a function selected from sulfide, disulfide or a substituted piperidinyl group;
(ii) A is a bond or represents a linear or branched ($C_1$-$C_{10}$) alkylene group, wherein 1 to 4 non adjacent carbon atom(s) may independently be replaced by an oxygen atom, a sulphur atom or an amino group, and may comprise from 1 to 4 carbon-carbon double bond(s);
(iii) $Y_3$—$C(Y_1)$—$Y_2$ is a polar group in which:
$Y_1$ represents O or S, preferably O;
$Y_2$ and $Y_3$ are similar or different and represent O, S, NH or a bond;
(iv) $R_{99}$ is any group, which may include at least one function F and/or at least one polar group as defined hereinabove.

The allyl monomer or oligomer included in the composition according to the present invention is a compound comprising an allyl group, said compound being selected from diethylene glycol bis(allyl carbonate), ethylene glycol bis(allyl carbonate), an oligomer of diethylene glycol bis(allyl carbonate), an oligomer of ethylene glycol bis(allyl carbonate), and mixtures thereof.

The amount of said allyl monomer or oligomer in the polymerizable composition according to the present invention is from 20 to 99%, in particular from 50 to 99% by weight, more particularly from 80 to 98%, even more particularly from 90 to 97% by weight, based on the total weight of the composition.

In particular, the polymerizable composition comprises from 20 to 99%, in particular 50 to 99% by weight, more particularly from 80 to 98%, even more particularly from 90 to 97% by weight, based on the total weight of the composition, of diethylene glycol bis(allyl carbonate), oligomers of diethylene glycol bis(allyl carbonate) or mixtures thereof.

The polymerizable composition may also comprise a second monomer or oligomer that is capable of polymerizing with the allyl monomer or oligomer described above. Examples of a suitable second monomer include: aromatic vinyl compounds such as styrene, [alpha]-methylstyrene, vinyltoluene, chlorostyrene, chloromethylstyrene and divinylbenzene; alkyl mono(meth)acrylates such as methyl (meth)acrylate, n-butyl (meth)acrylate, n-hexyl (meth)acrylate, cyclohexyl (meth)acrylate, 2-ethylhexyl (meth)acrylate, methoxydiethylene glycol (meth)acrylate, methoxypolyethylene glycol (meth)acrylate, 3-chloro-2-hydroxypropyl (meth)acrylate, stearyl (meth)acrylate, lauryl (meth)acrylate, phenyl (meth)acrylate, glycidyl (meth)acrylate and benzyl (meth)acrylate, 2-hydroxyethyl (meth)acrylate, 2-hydroxypropyl (meth)acrylate, 3-hydroxypropyl (meth)acrylate, 3-phenoxy-2-hydroxypropyl (meth)acrylate and 4-hydroxybutyl (meth)acrylate; di(meth)acrylates such as ethylene glycol di(meth)acrylate, diethylene glycol di(meth)acrylate, triethylene glycol di(meth)acrylate, polyethylene glycol di(meth)acrylate, 1,3-butylene glycol di(meth)acrylate, 1,6-hexanediol di(meth)acrylate, neopentyl glycol di(meth)acrylate, polypropylene glycol di(meth)acrylate, 2-hydroxy-1,3-di(meth)acryloxypropane, 2,2-bis[4-((meth)acryloxyethoxy)phenyl]propane, 2,2-bis[4-((meth)acryloxydiethoxy)phenyl]propane and 2,2-bis[4-((meth)-acryloxypolyethoxy)phenyl]propane; tri(meth)

acrylates such as trimethylolpropane tri(meth)acrylate and tetramethylolmethane tri(meth)acrylate; tetra(meth)acrylates such as tetramethylolmethane tetra(meth)acrylate; and diallylphthalates such as diallyl phthalate, diallyl isophthalate and diallyl terephthalate. These monomers may be used singly or in combination of two or more. In the above description, "(meth)acrylate" means "methacrylate" or "acrylate", and "(meth)acryloxy" means "methacryloxy" or "acryloxy".

The amount of the second monomer or oligomer in the polymerizable composition according to the present invention may be from 1 to 50% by weight, preferably from 2 to 20%, more preferably from 3 to 10% by weight, based on the total weight of the composition.

The catalyst included in the composition according to the present invention is a catalyst that is suitable for allyl monomer polymerization, such as for example an organic peroxide, an organic azo compound, and mixtures thereof.

Examples of a suitable organic peroxide include benzoyl peroxide, methyl ethyl peroxide, methyl ethyl ketone peroxide, di-t-butyl peroxide, lauroyl peroxide, acetyl peroxide, diisopropyl peroxydicarbonate, bis(4-t-butylcyclohexyl) peroxydicarbonate, t-butyl peroxy-2-ethylhexanoate, t-hexyl peroxy-2-ethylhexanoate, and mixtures thereof.

Examples of a suitable organic azo compound include 2,2'-azobisisobutyronitrile, dimethyl 2,2'-azobis(2-methylpropionate), 2,2'-azobis(2-methylbutyronitrile), 2,2'-azobis (2,4-dimethylvaleronitrile), 4,4'-azobis(4-cyanopentanoic acid), and mixtures thereof.

According to a preferred embodiment, the catalyst is diisopropyl peroxydicarbonate (IPP).

The amount of catalyst in the polymerizable composition according to the present invention may be from 1.0 to 5.0% by weight, preferably from 2.5 to 4.5% preferably from 3.0 to 4.0% by weight, based on the total weight of the composition.

The UV-absorber included in the composition according to the present invention is a compound that is responsible for the UV-cut of the resulting ophthalmic lens. By "UV-cut" it is meant the highest wavelength for which the transmittance is lower than 1% as measured according to the method described herein. Preferably, the UV absorber is chosen so that the ophthalmic lens obtained from the polymerizable composition of the present invention has a UV-cut of at least 380 nm.

According to a particular embodiment, the UV-absorber included in the composition according to the present invention is a benzotriazole, a benzophenone, a triazine, an oxalanilide, and mixtures thereof, preferably a benzotriazole and more preferably a hydroxyphenyl benzotriazole.

A hydroxyphenyl benzotriazole suitable for use as a UV-absorber is a compound having the following formula (II):

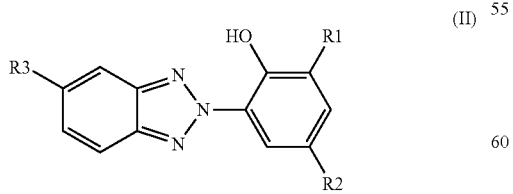

wherein R1 and R2 are independently hydrogen or a linear or branched ($C_1$-$C_{12}$) alkyl which is optionally substituted by a phenyl group;
and wherein R3 is hydrogen or halogen.

Preferably, the hydroxyphenyl benzotriazole UV-absorber is selected in the group consisting of 2-(2H-Benzotriazol-2-yl)-4-(1,1,3,3-tetramethylbutyl)phenol, 2-(2H-Benzotriazol-2-yl)-6-dodecyl-4-methylphenol, 2-(2-Hydroxy-5-methylphenyl)benzotriazole, 2-(2H-Benzotriazol-2-yl)-4,6-bis(1-methyl-1-phenylethyl)phenol, 2(2-hydroxy-5-tert-octylphenyl)benzotriazole, 2-(2H-Benzotriazol-2-yl)-4,6-di-tert-pentylphenol, 2-(2,4-dihydroxyphenyl)benzotriazole, 2-(2,4,6-trihydroxyphenyl)benzotriazole, 5-chloro-2-(2,4-dihydroxyphenyl)benzotriazole, 5-(chloro-2-(2,4,6-trihydroxyphenyl)benzotriazole, 5-bromo-2-(2,4-dihydroxyphenyl)benzotriazole, 5-bromo-2-(2,4,6-trihydroxyphenyl)benzotriazole, dichloro-2-(2,4-dihydroxyphenyl)benzotriazole, dibromodichloro-2-(2,4-dihydroxyphenyl)benzotriazole, and mixtures thereof.

A benzophenone suitable for use as a UV-absorber is a compound having the following formula (III):

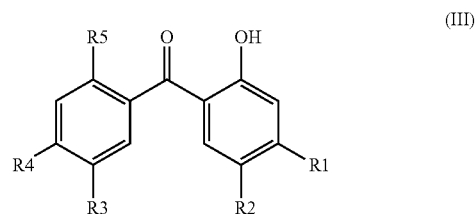

wherein R1 to R5 are independently hydrogen, hydroxy, a linear or branched ($C_1$-$C_{10}$) alkyl, a linear or branched ($C_1$-$C_{10}$) alkoxy, wherein said alkyl and alkoxy groups are optionally substituted by an acrylate or methacrylate group.

Preferably, the benzophenone UV-absorber is selected from the group consisting of 2-hydroxy-4-octyloxybenzophenone, 2-hydroxy-4-(2-acryloxyethoxy)-benzophenone, 2-hydroxy-4-(2-hydroxy-3-methacryloxy) propoxy-benzophenone, 2,2'-dihydroxy-4-methoxybenzophenone, 2,4-dihydroxybenzophenone, 2,2'-dihydroxy-4,4'-dimethoxybenzophenone, 2,2',4,4'-tetrahydroxybenzophenone, 2-hydroxy-4-acetoxyethoxybenzophenone, 2-hydroxy-4-methoxybenzophenone, 2,2'-dihydroxy-4,4'-dimethoxy-5,5'-disulfobenzophenone-disodium salt, 2,2',4,4'-tetrahydroxy-4-octyloxybenzophenone, 2,2',4'-trihydroxy-4-octyloxybenzophenone, and mixtures thereof.

A triazine suitable for use as a UV-absorber is a hydroxyphenyl triazine having the following formula (IV):

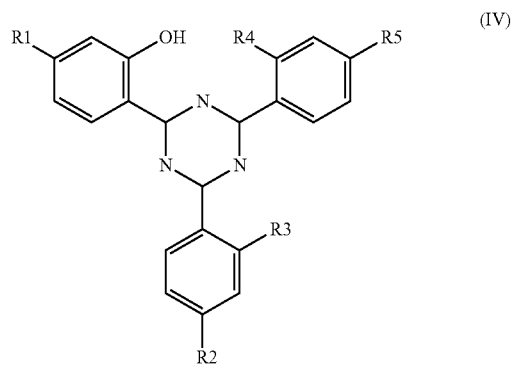

wherein R1 to R5 are independently hydrogen, hydroxy, halogen, cyano, nitro, a linear or branched ($C_1$-$C_{24}$) alkyl, a linear or branched ($C_1$-$C_{24}$) alkoxy, an aryl group, an aralkyl group wherein the alkyl part is linear or branched ($C_1$-$C_{24}$) group, a glycerol ether corresponding to the following formula —O—$CH_2$—CH(OH)—$CH_2$—OR6 wherein R6 is a linear or branched ($C_1$-$C_{15}$) alkyl.

Preferably, the hydroxyphenyl triazine UV-absorber is selected in the group consisting of 2,4-bis(2,4-dimethylphenyl)-6-(2-hydroxy-4-iso-octyloxyphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, a mixture of 2-[4-[2-hydroxy-3-tridecyloxypropyl]oxy]-2-hydroxyphenyl]-4,6-bis(2,4-dimethylphenyl)-1,3,5-triazine, 2-[4-[2-hydroxy-3-didecyloxypropyl]oxy]-2-hydroxyphenyl]-4,6-bis(2,4-dimethylphenyl)-1,3,5-triazine, and mixtures thereof.

An oxalanilide suitable for use as a UV-absorber is a compound having the following formula (V):

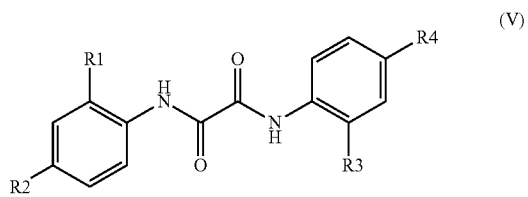

(V)

wherein R1 to R4 are independently hydrogen, hydroxy, a linear or branched ($C_1$-$C_{15}$) alkyl, a linear or branched ($C_1$-$C_{15}$) alkoxy.

Preferably, the oxalanilide UV-absorber is selected from the group consisting of N-(2-ethoxyphenyl)-N'-(4-isododecylphenyl)oxamide, N-(2-ethoxyphenyl)-N'-(2-ethylphenyl)oxamide, and mixtures thereof.

The amount of UV-absorber in the polymerizable composition according to the present invention may be from 0.01 to 5.0% by weight, preferably from 0.1 to 2.0%, more preferably from 0.2 to 1.0% by weight, based on the total weight of the composition.

The anti-yellowing additive included in the composition according to the present invention is a compound that is able to limit the yellow index of the resulting ophthalmic lens. By "yellow index" it is meant a value obtained by calculation from tristimulus values (X, Y, Z) according to ASTM D1925 standard.

Preferably, the anti-yellowing additive is chosen so that the ophthalmic lens obtained with the polymerizable composition of the present invention has a yellow index that is lower than or equal to 2.0, preferably lower than or equal to 1.7, more preferably lower than or equal to 1.5.

The anti-yellowing additive included in the composition of the present invention corresponds to general formula (I):

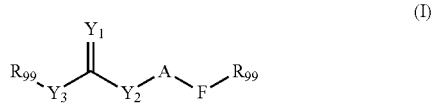

(I)

wherein:
(i) F represents a function selected from sulfide, disulfide or a substituted piperidinyl group;
(ii) A is a bond or represents a linear or branched ($C_1$-$C_{10}$)alkylene group, wherein 1 to 4 non adjacent carbon atom(s) may independently be replaced by an oxygen atom, a sulphur atom or an amino group, and may comprise from 1 to 4 carbon-carbon double bond(s);
(iii) $Y_3$—C($Y_1$)—$Y_2$ is a polar group in which:
$Y_1$ represents O or S, preferably O;
$Y_2$ and $Y_3$ are similar or different and represent O, S, NH or a bond;
(iv) $R_{99}$ are each independently any group, which may include at least one function F and/or at least one polar group as defined in (i) and (iii) respectively.

The anti-yellowing additive included in the composition of the present invention comprises one or several polar groups, which can be enumerated by C=$Y_1$ occurrences. Preferably, the molecular weight of the anti-yellowing additive divided by the number of $Y_3$—C($Y_1$)—$Y_2$ polar groups of the anti-yellowing additive is in the range of about 75 g/mol to about 1000 g/mol, preferably in the range of about 100 g/mol to about 800 g/mol.

According to an embodiment, the anti-yellowing additive may be a substituted piperidinyl group having the following formula (VI)

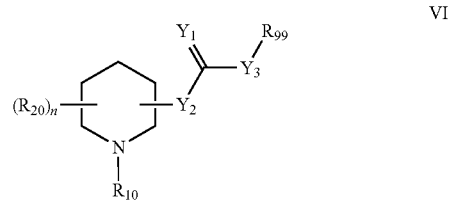

VI wherein
$R_{10}$ represents a group selected from H, —$R_a$, aryl, —XH, —X$R_a$, —C(X)—$R_a$, —C(X)—Y—$R_a$ and —($R_e$)—Z, in which:
$R_a$ represents a linear or branched ($C_1$-$C_{20}$) alkyl group, or a linear or branched ($C_2$-$C_{20}$) alkenyl group;
aryl represents a monocyclic or bicyclic ($C_6$-$C_{14}$) hydrocarbyl group, which may optionally be substituted with 1 to 4 substituents independently selected from halogen, linear or branched ($C_1$-$C_8$) alkyl, linear or branched ($C_1$-$C_8$) alkoxy, linear or branched ($C_1$-$C_8$) alkylthio, amino, linear or branched ($C_1$-$C_8$) monoalkylamino, and linear or branched ($C_1$-$C_8$) dialkylamino;
X represents oxygen or sulphur atom;
Y represents oxygen atom, sulphur atom or a group —$NR_b$ wherein $R_b$ represents hydrogen atom or a linear or branched ($C_1$-$C_{20}$) alkyl group;
$R_e$ represents a linear or branched ($C_1$-$C_{20}$) alkylene group, wherein 1 to 4 non adjacent carbon atom(s) may independently be replaced by an oxygen atom, a sulphur atom or an amino group —$NR_b$ as defined above, and may comprise from 1 to 4 carbon-carbon double bond(s);
Z represents a hydrogen atom or an aryl group as defined above;
$R_{20}$ represents a group selected from linear or branched ($C_1$-$C_8$) alkyl, linear or branched ($C_2$-$C_8$) alkenyl, linear or branched ($C_1$-$C_8$) alkoxy, linear or branched ($C_1$-$C_8$) alkylthio, and —($R_e$)—Z wherein $R_e$ and Z are defined as hereinbefore;
n is an integer from 1 to 4 inclusive; n may be equal 1, 2, 3 or 4;
$Y_1$ represents O or S, preferably O;

$Y_2$ and $Y_3$ are similar or different and represent O, S, NH or a bond;

$R_{99}$ is any group, preferably $R_{99}$ is a group selected from linear or branched ($C_1$-$C_8$) alkyl, substituted piperidinyl or a linear or branched ($C_1$-$C_{10}$) alkylene carrying a —COO—($C_1$-$C_{10}$)alkyl or a —COO-(substituted piperidinyl) group.

In a specific embodiment, the anti-yellowing additive may be a substituted 2,2,6,6-tetramethylpiperidine, more preferably compound having the following formula (VII):

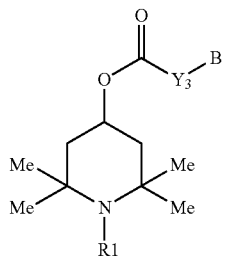

(VII)

wherein:

R1 is hydrogen, linear or branched ($C_1$-$C_{15}$) alkyl, linear or branched ($C_1$-$C_{15}$) acyl or linear or branched ($C_1$-$C_{15}$) alkoxy;

$Y_3$ represents O or a bond;

B is a group selected from linear or branched ($C_1$-$C_8$) alkyl, substituted piperidinyl or a linear or branched ($C_1$-$C_{10}$) alkylene carrying a —COO-alkyl or —COO-(substituted piperidinyl) group.

An anti-yellowing additive according to formula (VII) is known as a hindered amine light stabilizer (HALS) and will be referred to as a HALS anti-yellowing additive.

Particularly, the HALS anti-yellowing additive may correspond to the following formula (VIII):

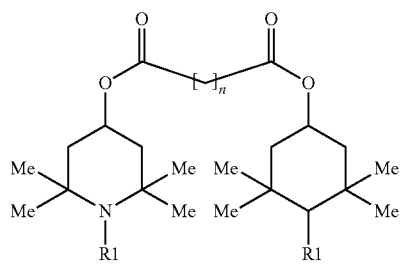

(VIII)

wherein each R1 is independently hydrogen, linear or branched ($C_1$-$C_{15}$) alkyl or linear or branched ($C_1$-$C_{15}$) alkoxy, preferably R1 is methyl or octyloxy; and n is an integer equal to 1, 2, 3, 4, 5, 6, 7, 8, 9 or 10, preferably n is equal to 8.

The HALS anti-yellowing additive may also particularly correspond to the following formula (IX):

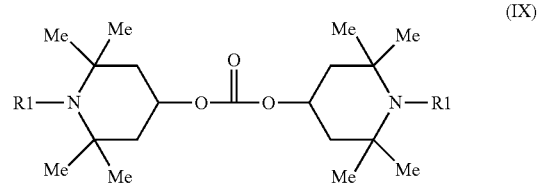

(IX)

wherein each R1 is independently linear or branched ($C_1$-$C_{15}$) alkyl or linear or branched ($C_1$-$C_{15}$) alkoxy, preferably R1 is undecyloxy.

According to another embodiment, the HALS anti-yellowing additive may be selected in the group consisting of bis(1-octyloxy-2,2,6,6-tetramethyl-4-piperidyl) sebacate, bis(1,2,2,6,6-pentamethyl-4-piperidyl) sebacate, methyl 1,2,2,6,6-pentamethyl-4-piperidyl sebacate, bis(1-undecanoxy-2,2,6,6-tetramethylpiperidin-4-yl)-carbonate, 1,2,2,6,6-pentamethyl-4-piperidyl methacrylate, and mixtures thereof.

According to another embodiment, the anti-yellowing additive may correspond to the following formula (X):

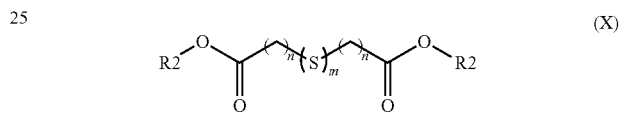

(X)

wherein:

each R2 is independently a linear or branched or cyclic ($C_1$-$C_{20}$) alkyl group wherein 1 to 4 non adjacent carbon atom(s) may be replaced by oxygen atom, sulphur atom, and amino group, and may comprise from 1 to 4 carbon-carbon double bond(s);

each n is an integer from 1 to 17 inclusive, preferably from 1 to 5 inclusive; n may be equal to 1, 2, 3, 4, 5, 6, 7, 8, 9, 10, 11, 12, 13, 14 15, 16 or 17;

and m is 1 or 2.

An anti-yellowing additive corresponding to formula (X) will be referred to as an ester (di)sulfide anti-yellowing additive.

Particularly, the ester (di)sulfide anti-yellowing additive may be a dialkyl thiodipropionate corresponding to formula (XIa) or a dialkyl 3,3'-dithiodipropionate corresponding to formula (XIb):

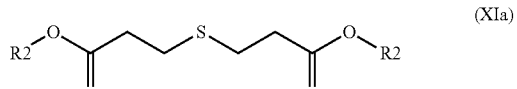

(XIa)

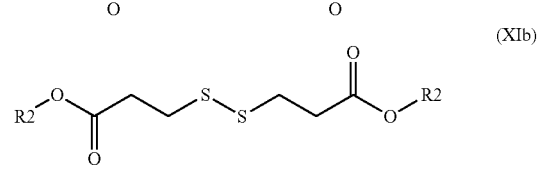

(XIb)

wherein each R2 is independently a linear or branched ($C_1$-$C_{15}$) alkyl, preferably R2 is methyl, ethyl, ethylhexyl, octyl or tridecyl.

Alternatively, the ester (di)sulfide anti-yellowing additive may be a dialkyl thiodiglycolate corresponding to formula (XIIa) or a dialkyl dithiodiacetate corresponding to formula (XIIb):

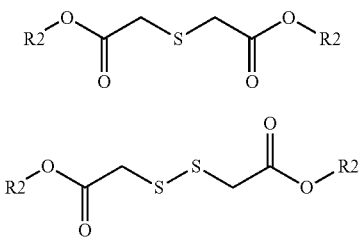

(XIIa)

(XIIb)

wherein each R2 is independently a linear or branched ($C_1$-$C_{15}$) alkyl, preferably R2 is methyl, ethyl, ethylhexyl, octyl or tridecyl.

According to another embodiment, the ester (di)sulfide anti-yellowing additive may be selected in the group consisting of ditridecyl thiodipropionate, diethylhexyl thiodipropionate, dioctyl thiodipropionate, dimethyl thiodipropionate, diethyl thiodiglycolate, ditridecyl dithiodipropionate, diethylhexyl dithiodipropionate, dioctyl dithiodipropionate, dimethyl dithiodipropionate, diethyl dithiodiacetate and mixtures thereof.

For example, the anti-yellowing additive of the polymerizable composition may be a mixture of bis(1-octyloxy-2,2,6,6-tetramethyl-4-piperidyl) sebacate and ditridecyl thiodipropionate.

According to another embodiment, the anti-yellowing additive may be selected in the group consisting of sulfide heterocycles such as thiane, dithiane and trithiane having the following formula (XIII):

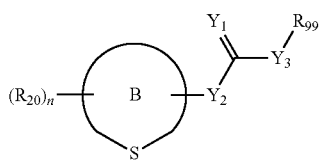

XIII wherein
- $R_{20}$ is as defined above;
- n is an integer from 1 to 5 inclusive, preferably from 1 to 3 inclusive; n may be equal to 1, 2, 3, 4 or 5;
- B represents a 3 to 12-membered monocyclic heterocycloalkyl which comprises, in addition to the sulphur atom of the cycle, from 1 to 3 heteroatom(s) independently selected from oxygen and sulphur, preferably sulphur; and
- $Y_1$ represents O or S, preferably O;
- $Y_2$ and $Y_3$ are similar or different and represent O, S, NH or a bond;
- $R_{99}$ is any group.

According to another embodiment, heterocyclic sulfide anti-yellowing additive may be selected in the group consisting of 1,3,5-trithiane-2-carboxylic acid, 1,3,5-trithiane-2,4-dicarboxylic acid, 1,3,5-trithiane-2,4,6-tricarboxylic acid, 1,2,3-trithiane-4-carboxylic acid, 1,2,3-trithiane-5-carboxylic acid, wherein carboxylic acid represents a linear or branched ($C_1$-$C_8$) carboxylic acid, preferably methanoic acid, propanoic acid or pentanoic acid, esters thereof, and mixtures thereof.

Surprisingly, some heterocyclic sulfides without polar groups are soluble in monomer and or oligomer compositions. Anti-yellowing additives according to the invention may also be selected from sulfide heterocycles having the following formula (XIV):

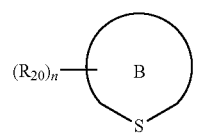

XIV wherein $R_{20}$, n and B are as defined above; preferably B is a trithiane derivative, n is 3, 4, 5 or 6, and R20 is a linear or branched ($C_1$-$C_{15}$) alkyl group.

In a specific embodiment, the sulfide heterocycle that may be used as an anti-yellowing additive is a compound of formula (XV):

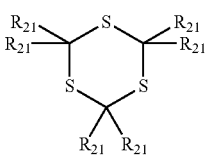

XV wherein each $R_{21}$ is independently hydrogen or a linear or branched ($C_1$-$C_{15}$) alkyl group.

Examples of sulfide heterocycles that may be used as anti-yellowing additives are 2,2,4,4,6,6-hexamethyl-1,3,5-trithiane, 2,4,6-trimethyl-1,3,5-trithiane and 2,4,6-triethyl-1,3,5-trithiane. In addition, some sulfides or disulfides without polar groups and having a low molecular weight are soluble in monomer and/or oligomer compositions Anti-yellowing additives according to the invention may also be selected from linear, branched, cyclic and/or aromatic hydrocarbon chains comprising from 5 to 25 carbon atoms, in which at least one carbon atom is replaced by sulphur atom, providing at least one sulfide or disulfide function, and comprising eventually unsaturated bonds, hydroxy (OH) or thiol (SH) characteristic groups.

Especially, compounds comprising one sulfide or disulfide function may be used: dialkyl sulfide, dialkyl disulfide, dialkenyl sulfide, dialkenyl disulfide, wherein alkyl represents a saturated linear or branched hydrocarbon chain comprising from 1 to 12 carbon atom(s), preferably form 1 to 6 carbon atom(s) and alkenyl represents an unsaturated linear or branched hydrocarbon chain comprising from 2 to 12 carbon atoms, preferably from 2 to 6 carbon atoms and comprising eventually hydroxy (OH) or thiol (SH) characteristic groups are suitable anti yellowing additives.

Examples of such additives are di-ter-butyl disulfide, di-sec-butyl disulfide, di-n-butyl disulfide, di-ter-butyl sulfide, di-sec-butyl sulfide, di-n-butyl sulfide, di-n-propyl sulfide, di-i-propyl sulfide, di-n-propyl disulfide, di-i-propyl disulfide butylpropyl sulfide, butylpropyl disulfide, ethylphenyl sulfide, di-ethylhexyl suflide and diallylsulfide. Dibutyl sulfide and diallylsuflide are particularly suitable for the invention.

Other examples of such additives comprising hydroxy or thiol characteristic groups may be selected from hydroxyl alkyl sulfide or mercapto alkyl sulfide such as bis(2-mercaptoethyl) sulfide, bis(2-hydroxyethyl) sulfide (also know as thiodiglycol), 2-hydroxyethyl 2'-mercaptoethyl sulfide, bis(2-mercaptoethyl) disulfide, bis(2-hydroxyethyl) disulfide, 2-(2-mercaptoethylthio)propane-1,3-dithiol, bis(2,3-dimercaptopropanyl)sulfide, bis(2,3-dimercaptopropanyl)disulfide or 3-((2,3-dimercaptopropyl)thio)propane-1,2-dithiol. These sulfide compounds may also have hydroxyl groups replacing hydrosulfide groups.

Compounds comprising at least two sulfide functions, and preferably 5 or less sulfide functions, are also suitable. Various products obtained by addition of mercaptoalcohol on polyols or epihalohydrines, followed by treatment with thiourea may be used, as for instance 4-mercaptomethyl-1,8-dimercapto-3,6-dithiaoctane, 2,3-bis(2-mercaptoethylthio)propane-1-thiol, 2-(2,3-bis(2-mercaptoethylthio)propylthio)ethanethiol, 1,2-bis(2-mercaptoethylthio)-3-mercaptopropane, 1,2-bis(2-(2-mercaptoethylthio)-3-mercaptopropylthio)ethane, bis(2-(2-mercaptoethylthio)-3-mercaptopropyl)sulfide, bis(2-(2-mercaptoethylthio)-3-mercaptopropyl)disulfide, 2-(2-mercaptoethylthio)-3-2-mercapto-3-[3-mercapto-2-(2-mercaptoethylthio)-propylthio]propylthiopropane-1-thiol, 2-(2-mercaptoethylthio)-3-(2-(2-[3-mercapto-2-(2-mercaptoethylthio)-propylthio]ethylthio)ethylthio)propane-1-thiol, 4,11-bis(mercaptomethyl)-3,6,9,12-tetrathiatetradecane-1,14-dithiol, 4,14-bis(mercaptomethyl)-3,6,9,12,15-pentathiaheptane-1,17-dithiol, 3-(3-mercapto-2-((2-mercaptoethyl)thio)propyl)thio)propylthio)-2-((2-mercaptoethyl)thio)propane-1-thiol, 3,3'-dithiobis(propane-1,2-dithiol), 7,11-bis(mercaptomethyl)-3,6,9,12,15-pentathiaheptane-1,17-dithiol, 7,12-bis(mercaptomethyl)-3,6,9,10,13,16-hexathiaoctadecane-1,18-dithiol, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2,2-bis(mercaptodimethylthio)ethyl)-1,3-dithietane. These polysulfide compounds may also have hydroxyl groups replacing hydrosulfide groups.

According to another embodiment, the polymerizable composition according to the present invention may comprise a mixture of a HALS anti-yellowing additive of formula (VII), (VIII) or (IX) and a sulfide anti-yellowing additive of formula (X), (XIII), (XIV) or (XV) as defined above. The weight ratio of HALS anti-yellowing additive to sulfide anti-yellowing additive may range from 1:4 to 4:1, preferably from 1:2 to 2:1.

The amount of anti-yellowing additive(s) in the polymerizable composition according to the present invention may be from 0.05 to 1% by weight, preferably from 0.1 to 0.5% by weight, based on the total weight of the composition.

The polymerizable composition according to the present invention may also optionally comprise other constituents such as demolding agents, optical brighteners, dyes, pigments, antioxidants, chain transfer additives, inorganic fillers, and mixtures thereof.

In a second embodiment of the present invention, the polymerizable composition for the manufacture of an ophthalmic lens comprises:
a) at least one allyl monomer or oligomer,
b) at least one catalyst suitable for initiating the polymerization of said allyl monomer or oligomer,
c) at least one UV absorber,
d) at least one anti-yellowing additive selected from:
   an ester (di)sulfide anti-yellowing additive having the following formula (XX):

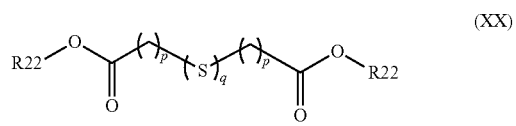

wherein
each R22 is independently a linear or branched or cyclic ($C_1$-$C_{12}$) alkyl group wherein 1 to 4 non adjacent carbon atom(s) may be replaced by oxygen atom, sulphur atom, and amino group, and may comprise from 1 to 4 carbon-carbon double bond(s);
each p is an integer from 1 to 17 inclusive, preferably from 1 to 5 inclusive; p may be equal to 1, 2, 3, 4, 5, 6, 7, 8, 9, 10, 11, 12, 13, 14 15, 16 or 17; and
q is 1 or 2; or
a cyclic sulphide having the following formula (XIII):

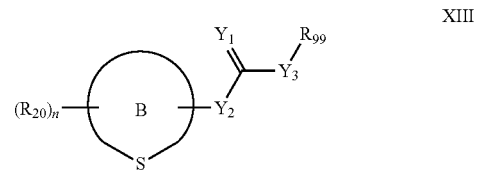

wherein
$R_{20}$ is as defined above;
n is an integer from 1 to 5 inclusive, preferably from 1 to 3 inclusive; n may be equal to 1, 2, 3, 4 or 5;
B represents a 3 to 12-membered monocyclic heterocycloalkyl which comprises, in addition to the sulphur atom of the cycle, from 1 to 3 heteroatoms independently selected from oxygen and sulphur, preferably sulphur; and
$Y_1$ represents O or S, preferably O;
$Y_2$ and $Y_3$ are similar or different and represent O, S, NH or a bond;
$R_{99}$ is any group.

Except for the allyl monomer/oligomer and the anti-yellowing additive, the constituents of the polymerizable composition of the second embodiment of the present invention and their respective amounts in said composition are as defined for the polymerizable composition of the first embodiment of the present invention. In particular, the definitions of the second monomer/oligomer, the catalyst, the UV-absorber and the optional constituents given for the composition of the first embodiment of the present invention equally apply to the composition of the second embodiment of the present invention The allyl monomer or oligomer or the composition of the second embodiment of the present invention is any compound comprising an allyl group.

According to an embodiment, the allyl monomer or oligomer is a diallyl sulfide, a diallyl phthalate, a diallyl isophthalate, a diallyl terephthalate, a diallyl carbonate, an allyl methane sulfonate, and mixtures thereof.

In particular, the allyl monomer is a diallyl carbonate selected from diethylene glycol bis(allyl carbonate), ethylene glycol bis(allyl carbonate), oligomers of diethylene glycol bis(allyl carbonate), oligomers of ethylene glycol bis(allyl carbonate), and mixtures thereof.

The amount of said allyl monomer or oligomer in the polymerizable composition according to the present invention is from 20 to 99%, in particular from 50 to 99% by weight, more particularly from 80 to 98%, even more particularly from 90 to 97% by weight, based on the total weight of the composition.

In particular, the polymerizable composition comprises from 20 to 99%, in particular 50 to 99% by weight, more particularly from 80 to 98%, even more particularly from 90 to 97% by weight, based on the total weight of the composition, of diethylene glycol bis(allyl carbonate), oligomers of diethylene glycol bis(allyl carbonate) or mixtures thereof.

The composition of the second embodiment of the present invention comprises a specific anti-yellowing additive selected from an ester (di)sulfide anti-yellowing additive of formula (XX) or a cyclic sulphide of formula (XIII).

In particular, the anti-yellowing additive may correspond to the following formula (XX):

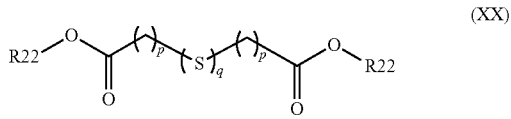
(XX)

wherein each R22 is independently a linear or branched or cyclic ($C_1$-$C_{12}$) alkyl group wherein 1 to 4 non adjacent carbon atom(s) may be replaced by oxygen atom, sulphur atom, and amino group, and may comprise from 1 to 4 carbon-carbon double bond(s);

each p is an integer from 1 to 17 inclusive, preferably from 1 to 5 inclusive; p may be equal to 1, 2, 3, 4, 5, 6, 7, 8, 9, 10, 11, 12, 13, 14 15, 16 or 17; and q is 1 or 2.

Particularly, the ester (di)sulfide anti-yellowing additive may be a dialkyl thiodipropionate corresponding to formula (XXIa) or a dialkyl 3,3'-dithiodipropionate corresponding to formula (XXIb):

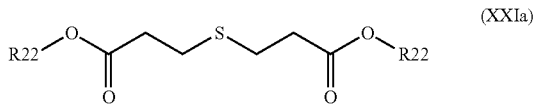
(XXIa)

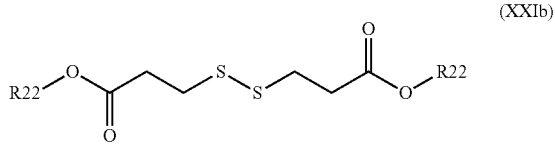
(XXIb)

wherein each R22 is independently a linear or branched ($C_1$-$C_{12}$) alkyl, preferably R22 is methyl, ethyl, ethylhexyl or octyl.

Alternatively, the ester (di)sulfide anti-yellowing additive may be a dialkyl thiodiglycolate corresponding to formula (XIIa) or a dialkyl dithiodiacetate corresponding to formula (XIIb):

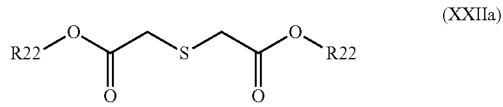
(XXIIa)

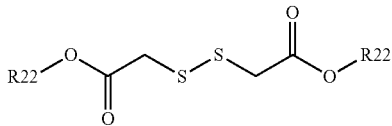
(XXIIb)

wherein each R22 is independently a linear or branched ($C_1$-$C_{12}$) alkyl, preferably R22 is methyl, ethyl, ethylhexyl or octyl.

In particular, the ester (di)sulfide anti-yellowing additive may be selected in the group consisting of diethylhexyl thiodipropionate, dioctyl thiodipropionate, dimethyl thiodipropionate, diethyl thiodiglycolate, diethylhexyl dithiodipropionate, dioctyl dithiodipropionate, dimethyl dithiodipropionate, diethyl dithiodiacetate and mixtures thereof.

According to another embodiment, the anti-yellowing additive may be selected in the group consisting of sulfide heterocycles such as thiane, dithiane and trithiane having the following formula (XIII):

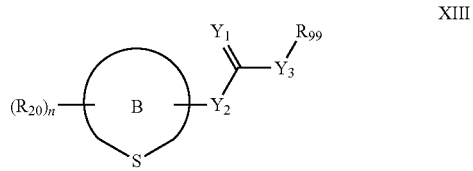
XIII wherein $R_{20}$ is as defined above;

n is an integer from 1 to 5 inclusive, preferably from 1 to 3 inclusive; n may be equal to 1, 2, 3, 4 or 5;

B represents a 3 to 12-membered monocyclic heterocycloalkyl which comprises, in addition to the sulphur atom of the cycle, from 1 to 3 heteroatoms independently selected from oxygen and sulphur, preferably sulphur; and $Y_1$ represents O or S, preferably O;

$Y_2$ and $Y_3$ are similar or different and represent O, S, NH or a bond;

$R_{99}$ is any group.

In particular, the heterocyclic sulfide anti-yellowing additive may be selected in the group consisting of 1,3,5-trithiane-2-carboxylic acid, 1,3,5-trithiane-2,4-dicarboxylic acid, 1,3,5-trithiane-2,4,6-tricarboxylic acid, 1,2,3-trithiane-4-carboxylic acid, 1,2,3-trithiane-5-carboxylic acid, wherein carboxylic acid represents a linear or branched ($C_1$-$C_8$) carboxylic acid, preferably methanoic acid, propanoic acid or pentanoic acid, esters thereof, and mixtures thereof.

The amount of anti-yellowing additive(s) in the polymerizable composition according to the second embodiment of the present invention may be from 0.05 to 1% by weight, preferably from 0.1 to 0.5% by weight, based on the total weight of the composition.

Process for Manufacturing an Ophthalmic Lens

The process carried out for the manufacture of an ophthalmic lens from the composition described herein comprises mixing the allyl monomer or oligomer, the catalyst, the UV absorber and the anti-yellowing additive(s) as defined above and polymerizing the obtained composition to prepare an ophthalmic lens. Preferably, polymerization is done thermally.

According to a preferred embodiment, the composition may be stirred until homogeneous and subsequently degassed and/or filtered before polymerization.

The polymerizable composition of the present invention described above may be cast into a casting mold for forming a lens and polymerized by heating at a temperature of from 40 to 95° C., preferably from 45 to 85° C. According to a preferred embodiment, the heating may last for 5 to 24 hours, preferably 7 to 22 hours, more preferably 15 to 20 hours.

The casting mold may then be disassembled and the lens may be cleaned with water, ethanol or isopropanol.

The lens may then be coated with one or more coatings selected from the group consisting of an anti-abrasion coating, an anti-reflection coating, an antifouling coating, an antistatic coating, an anti-fog coating, a polarizing coating, a tinted coating and a photochromic coating.

The lens may typically comprise an anti-abrasion coating disposed on the lens directly after polymerization or after applying an impact-resistant primer latex coating. The abrasion-resistant coating may be formed from alkyl (meth) acrylate or by a sol-gel process with at least one epoxy-alkoxysilane and optionally at least one alkoxysilane, as described in European patent No 0 614 957, for example.

The anti-abrasion coating may be applied to the lens by known methods, for example by spin coating, dip coating, bar coating or spray coating.

After applying the anti-abrasion coating on the lens, it may be cured by heating in an oven or by infrared, typically at a temperature of 60 to 200° C., preferably 80 to 150° C., for a period of 30 min to 3 hours. It may also be cured by UV irradiation.

Optionally, an antireflection coating may then be applied over the abrasion-resistant coating, according to the same coating methods. Anti-reflection coatings are well-known and typically comprise a monolayer or multilayer stack of dielectric materials such as SiO, $SiO_2$, $Al_2O_3$, $MgF_2$, LiF, $Si_3N_4$, $TiO_2$, $ZrO_2$, $Nb_2O_5$, $Y_2O_3$, $HfO_2$, $Sc_2O_3$, $Ta_2O_5$, $Pr_2O_3$, and mixtures thereof. It is preferred to use a multilayer stack comprising alternating layers of inorganic dielectric materials with a high refractive index (RI>1.55) and a low refractive index (RI<1.55).

Use of the Composition for Manufacturing an Ophthalmic Lens

The present invention also pertains to the use of the composition according to the present invention to manufacture an ophthalmic lens, and to the lens thus obtained.

The ophthalmic lens obtained according to the present invention may have a Yellow Index lower than or equal to 2.0, preferably lower than or equal to 1.7, more preferably lower than or equal to 1.5, as measured according to ASTM D-1925 immediately after manufacture. The Yellow Index after manufacture reflects the interactions of the UV absorber with the catalyst and radicals.

According to another embodiment, the polymerizable composition may comprise other additives to lower Yellow Index after manufacture, such as dyes, optical brighteners and/or pigments. Examples of such additives may be selected in pigments classified in Blue, Violet and/or Red in the Colour Index, especially in the families of organic, organo-metallic and mineral pigments such as porphyrin, phtalocyanin, aluminates, silicates and aluminosilicates. Suitable additives are for instance CI pigment blue 29, CI pigment violet 15, CI pigment red 259, CI pigment blue 15, CI pigment blue 28, CI pigment violet 16.

The ophthalmic lens according to the present invention may have a variation in the Yellow Index after exposing said lens to UV light for 80 h that does not exceed 0.5 in absolute value. The variation in the Yellow Index after exposing the lens to UV light for 80 h reflects the ageing behaviour of the lens, more particularly the degradation of the polymer matrix by UV rays which leads to the formation of yellow by-products.

The ophthalmic lens obtained according to the present invention exhibit satisfying mechanical properties due to complete reticulation during polymerization.

The invention will now be described in more detail with the following examples which are given for purely illustrative purposes and which are not intended to limit the scope of this invention in any manner.

EXAMPLES

Figures

MEASURING METHODS

Figure 1:
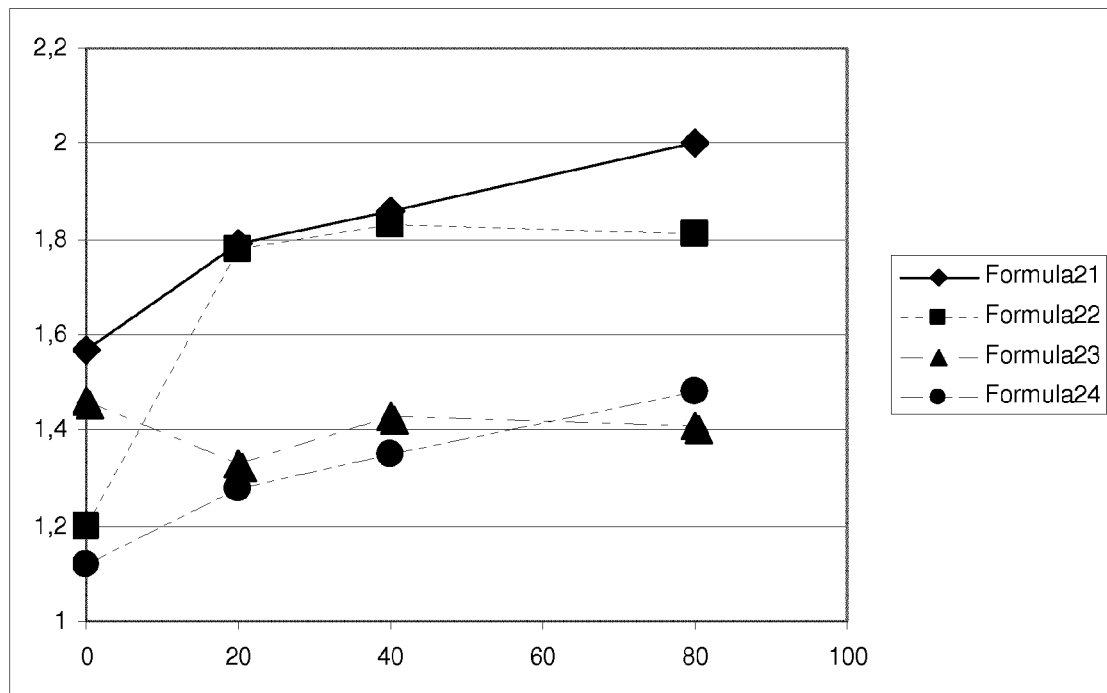
FIG. 1 is a graph of Yellow index as a function of time for formulae 21-24 as described in example 2.

The following measures are carried out on a lens that is 2 mm thick in its center and that has been cleaned with isopropyl alcohol.

The UV-cut of the lens is determined with a spectrophotometer (Cary50) under normal incident light by plotting the graph of the transmittance percentage of the lens as a function of the wavelength. The UV-cut of the material can be read on the graph as the wavelength corresponding to a transmittance of 1%.

The Yellow Index is measured according to ASTM D-1925 immediately after manufacture or after accelerated ageing in Q-Sun cell (80 hours of UV light exposition in a Xenon test chamber Q-SUN® Xe-3 from Q-LAB at 23° C. (±5° C.) and 20% (±5%) of relative humidity).

Materials

In the examples, the following compounds are used:

| Component | CAS number | Function |
|---|---|---|
| CR-39 ® | 142-22-3 | allyl monomer |
| CR-39E ® |  | allyl monomer (as disclosed in U.S. Pat. No. 7,214,754) |
| IPP | 105-64-6 | organic peroxide catalyst |
| Seesorb ® 709 | 3147-75-9 | hydroxyphenyl benzotriazole UV Absorber |
| Tinoguard ® TL | 125304-04-3 | hydroxyphenyl benzotriazole UV Absorber |
| Tinuvin ® 5100 | 129757-67-1 | Anti-Yellowing Additive (available from BASF) |

-continued

| Component | CAS number | Function |
|---|---|---|
| LA-81 | 705257-84-7 | Anti-Yellowing Additive (available from ADEKA Corp) |
| Tinuvin ® 292 | Mixture of 82919-37-7 and 41556-26-7 | Anti-Yellowing Additive (available from BASF) |
| AO-503 | 10595-72-9 | Anti-Yellowing Additive (available from ADEKA Corp) |
| Di methyl thio dipropionate (DMTDP) | 4131-74-2 | Anti-Yellowing Additive (available from Sigma Aldrich) |
| Allyl sulfide (DAS) | 592-88-1 | Anti-Yellowing Additive (available from Sigma Aldrich) |
| dibutyl sulfide (DBuS) | 544-40-1 | Anti-Yellowing Additive (available from Sigma Aldrich) |
| Di-tert-butyl disulfide (DTBuDS) | 110-06-5 | Anti-Yellowing Additive (available from Sigma Aldrich) |
| 2,2,4,4,6,6-hexamethyl-1,3,5-trithiane | 828-26-2 | Anti-Yellowing Additive (available from Sigma Aldrich) |

Example 1: Effect of Different Anti-Yellowing Additives Immediately after Polymerization Formulae 1-47 comprising the following ingredients were prepared. The values expressed in the tables below are weight percentages based on the total weight of the composition.

| Formula # | 1 | 2 | 3 | 4 | 5 | 6 | 7 | 8 | 9 | 10 | 11 |
|---|---|---|---|---|---|---|---|---|---|---|---|
| CR-39E ® | 2 | 2 | 2 | 2 | 2 | 2 | 2 | 2 | 2 | 2 | 2 |
| AO-503 | | | | 0.05 | 0.1 | 0.2 | 0.3 | | | | |
| LA-81 | | | | | | | | 0.05 | 0.1 | 0.2 | 0.3 |
| Seesorb ® 709 | 0.23 | 0.23 | 0.23 | 0.23 | 0.23 | 0.23 | 0.23 | 0.23 | 0.23 | 0.23 | 0.23 |
| IPP | 2.92 | 3.65 | 3.8 | 3.65 | 3.65 | 3.65 | 3.65 | 3.65 | 3.65 | 3.65 | 3.65 |
| CR-39 ® | 94.9 | 94.1 | 94 | 94.1 | 94 | 93.9 | 93.8 | 94.1 | 94 | 93.9 | 93.8 |
| Yellow Index after manufacture | 1.48 | 1.96 | 2.15 | 1.43 | 1.39 | 1.38 | 1.40 | 1.70 | 1.60 | 1.70 | 1.80 |

| Formula # | 12 | 13 | 14 | 15 | 16 | 17 | 18 | 19 |
|---|---|---|---|---|---|---|---|---|
| CR-39E ® | 2 | 2 | 2 | 2 | 2 | 2 | 2 | 2 |
| Tinuvin ® 292 | | | | | 0.05 | 0.1 | 0.2 | 0.3 |
| Tinuvin ® 5100 | 0.05 | 0.1 | 0.2 | 0.3 | | | | |
| Seesorb ® 709 | 0.23 | 0.23 | 0.23 | 0.23 | 0.23 | 0.23 | 0.23 | 0.23 |
| IPP | 2.92 | 3.65 | 3.8 | 3.65 | 3.65 | 3.65 | 3.65 | 3.65 |
| CR-39 ® | 94.9 | 94.1 | 94 | 94.1 | 94 | 93.9 | 93.8 | 93.8 |
| Yellow Index after manufacture | 1.55 | 1.55 | 1.57 | 1.54 | 1.76 | 1.67 | 1.65 | |

| Formula # | 21 | 22 | 23 | 24 | 25 | 26 | 27 | 28 | 29 |
|---|---|---|---|---|---|---|---|---|---|
| CR-39E ® | 2.00 | 2.00 | 2.00 | 2.00 | 2.00 | 2.00 | 2.00 | 2.00 | 2.00 |
| AO-503 | | 0.15 | | 0.2 | | | 0.05 | 0.10 | 0.15 |
| Tinuvin ® 5100 | | | 0.15 | 0.15 | 0.10 | 0.15 | 0.05 | 0.10 | 0.15 |
| Seesorb ® 709 | 0.23 | 0.23 | 0.23 | 0.23 | | | | | |
| Tinoguard ® TL | | | | | 0.23 | 0.23 | 0.23 | 0.23 | 0.23 |
| IPP | 3.50 | 3.50 | 3.50 | 3.50 | 3.65 | 3.65 | 3.65 | 3.65 | 3.65 |
| CR-39 ® | 94.27 | 94.50 | 94.12 | 93.92 | 94.02 | 93.97 | 94.02 | 93.92 | 93.82 |

| Formula # | 30 | 31 | 32 | 33 | 34 | 35 | 36 | 37 | 38 | 39 |
|---|---|---|---|---|---|---|---|---|---|---|
| CR-39E ® | 2.00 | 2.00 | 2.00 | 2.00 | 2.00 | 2.00 | 2.00 | 0 | 0 | 0 |
| LA-81 | 0.02 | 0.04 | 0.06 | 0.08 | | | | | | |
| Tinuvin ® 5100 | | | | | | | | 0.05 | 0.10 | 0.15 |
| Seesorb ® 709 | | | | | 0.22 | 0.22 | 0.22 | | | |
| AO-503 | | | | | | | | 0.05 | 0.10 | 0.15 |
| Tinoguard ® TL | 0.23 | 0.23 | 0.23 | 0.23 | | | | 0.23 | 0.23 | 0.23 |
| DMTDP | 0.03 | 0.06 | 0.09 | 0.12 | 0.05 | 0.10 | 0.20 | | | |

-continued

| Formula # | 30 | 31 | 32 | 33 | 34 | 35 | 36 | 37 | 38 | 39 |
|---|---|---|---|---|---|---|---|---|---|---|
| IPP | 4.38 | 4.38 | 4.38 | 4.38 | 4.38 | 4.38 | 4.38 | 3.65 | 3.65 | 3.65 |
| CR-39 ® | 94.27 | 94.50 | 94.12 | 93.92 | 93.35 | 93.30 | 93.20 | 96.02 | 95.92 | 95.82 |
| Yellow Index after manufacture | 1.34 | 1.32 | 1.40 | 1.36 | 1.30 | 1.32 | 1.40 | 1.89 | 1.84 | 1.77 |

| Formula # | 40 | 41 | 42 | 43 | 44 | 45 | 46 | 47 |
|---|---|---|---|---|---|---|---|---|
| CR-39E ® | 2.00 | 2.00 | 2.00 | 2.00 | 2.00 | 2.00 | 2.00 | 2.00 |
| Seesorb 709 | 0.22 | 0.22 | 0.22 | 0.22 | 0.22 | 0.22 | 0.22 | 0.22 |
| DTBuDS | 0.05 | 0.20 | | | | | | |
| DBuS | | | 0.05 | 0.20 | | | | |
| DAS | | | | | 0.05 | 0.10 | | |
| Trithiane | | | | | | | 0.02 | 0.05 |
| IPP | 4.38 | 4.38 | 4.38 | 4.38 | 4.38 | 4.38 | 4.38 | 4.38 |
| CR-39 ® | 93.35 | 93.2 | 93.35 | 93.2 | 93.35 | 93.3 | | |
| Yellow Index after manufacture | 1.45 | 1.50 | 1.35 | 1.47 | 1.57 | 1.69 | 1.32 | 1.40 |

Each composition was manufactured by weighing and mixing the ingredients in a beaker. CR-39E was first added, followed by the anti-yellowing additive, when present, and CR-39. Once the mixture was homogeneous, the UV-absorber was added and the beaker content was mixed again until full dissolution. Finally, the catalyst (IPP) was added and the mixture was stirred thoroughly, then degassed and filtered. A 71 mm diameter glass bi-plano mold was then filled with the composition using a syringe, and the polymerization was carried out in a regulated electronic oven in which the temperature was gradually increased from 45° C. to 85° C. in 15 hours then kept constant at 85° C. for 5 hours. The mold was then disassembled and the resulting lens had a 2 mm thickness in its center.

All of formulae 1-47 yielded a lens having the required 380 nm UV-cut. The Yellow Index was measured immediately after manufacture of each lens.

Formulae 1-3 did not contain any anti-yellowing additive but contained increasing amounts of IPP catalyst (2.92 to 3.80%). The Yellow index increased linearly with IPP concentration, evidencing that UV absorber interacts with radicals during polymerization.

Formulae 4 to 7 contained various amounts of sulfide anti-yellowing additive AO-503. The sharp drop of Yellow Index value between formulae 2 and 4 indicated that AO-503 is effective at low concentrations. Adding more AO-503 (formulae 5 to 7) didn't induce further Yellow index reduction. If AO-503 anti-yellowing additive had been reacting with IPP, thus reducing IPP concentration available for polymerization initiation, the values of Yellow index would be decreasing in the same proportion as formulae 1-3 and/or polymerization achievement would be inadequate. Hence, these results demonstrate that an unexpected behaviour is obtained: the anti-yellowing additive protects the UV absorber without altering polymerization achievement.

Formulae 8 to 11 contained various amounts of HALS anti-yellowing additive LA-81. This anti-yellowing additive was less efficient in reducing the Yellow index than sulfide anti-yellowing additive AO-503 but it was still able to protect the UV absorber as can be seen from the difference in Yellow index between formula 2 and 8 or 9.

Similar results were obtained with other HALS anti-yellowing additive such as Tinuvin®5100 or Tinuvin®292 (formulae 12-19) and with other sulfide anti-yellowing additives (formulae 30-47): Yellow index after polymerization is lower than 2, often lower than 1.5.

In formulae 22, 35 and 43, minute amounts of pigments were added after addition of catalyst to improve Yellow Index. CI pigment blue 29 was added: 30 ppm in formula 22; 40 ppm in formula 35 and 30 ppm in formula 43. After casting, Yellowness Index were respectively 1.10; 1.02 and 1.09. Pigment addition resulted in a decrease of Yellow Index of about 0.3.

Example 2: Effect of Different Anti-Yellowing Additives on Lens Ageing

Figure 2:
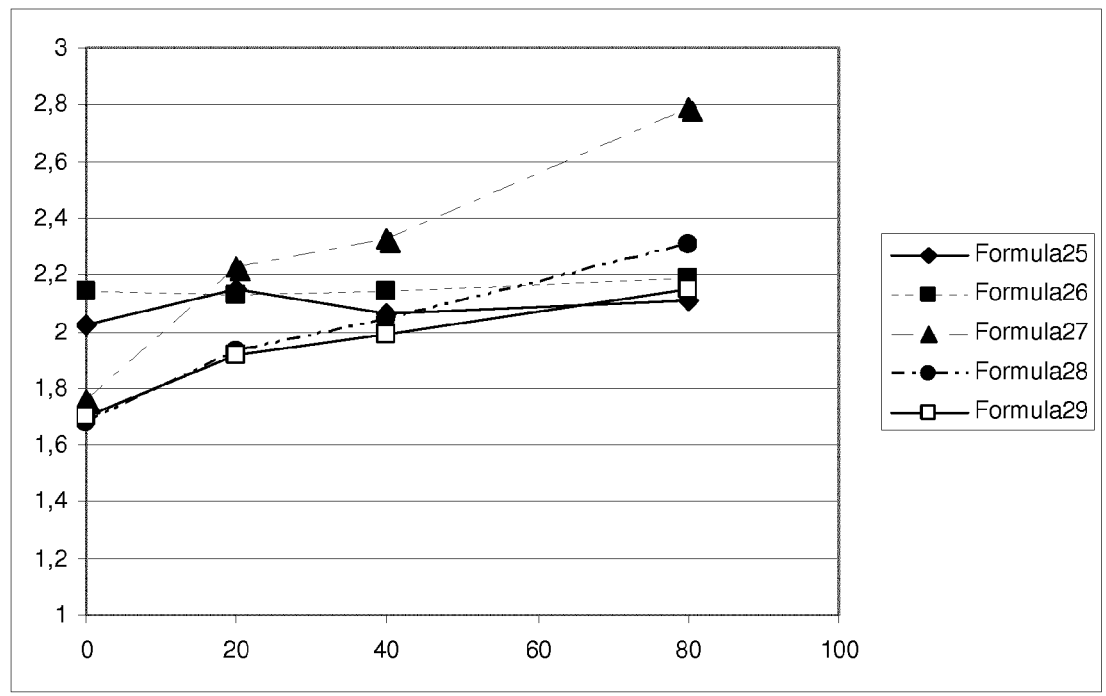
FIG. 2 is a graph of Yellow index as a function of time for formulae 25-29 as described in example 2.

Lenses obtained with formulae 21-29 were subjected to an accelerated ageing in Q-Sun cell. The evolution of Yellow Index in time for formulae 21-24 is shown in FIG. 1 and the evolution of Yellow Index in time for formulae 25-29 is shown in FIG. 2.

Formula 22 containing sulfide anti-yellowing additive AO-503 did not provide stabilization toward UV exposure. Indeed, between 0 and 20 h, the Yellow index reached the value obtained without any anti-yellowing additive (formula 21).

Formula 23 containing HALS anti-yellowing additive Tinuvin® 5100 was photostable, as the Yellow index remained stable during all the test duration.

Formula 24 comprised a mixture of HALS anti-yellowing additive and sulfide anti-yellowing additive (AO-503 and Tinuvin® 5100). Results show that the benefits of both these anti-yellowing additives were combined: low initial yellow index from sulfide anti-yellowing additive AO-503 (as previously pointed out in Example 1), and reduced Yellow index build-up during accelerated ageing brought by HALS anti-yellowing additive Tinuvin® 5100.

Formulae 25 to 29 contained the hydroxyphenyl benzotriazole UV-absorber Tinoguard® TL. At 0.10% or 0.15% by weight of Tinoguard® 5100 (formula 25 and 26), the UV-absorber was able to photostabilize the lens toward UV exposure. As observed in the above experiments with Seesorb® 709 (formulae 21-24), the Yellow index remained stable during all the tests.

Concerning blends of sulfide anti-yellowing additive AO-503 and HALS anti-yellowing additive Tinuvin® 5100, the results also confirmed those obtained above with Seesorb® 709: sulfide anti-yellowing additive AO-503 allowed a low Yellow index after polymerization, whereas Tinuvin® 5100 prevented excessive Yellow index increase during accelerated ageing. However, if the quantity of sulfide anti-yellowing additive and HALS anti-yellowing additive is too low (formula 27), the effect of sulfide anti-yellowing additive on the Yellow index immediately after manufacture is maintained whereas the Yellow index increases dramatically during accelerated ageing.

The invention claimed is:
1. A polymerizable composition for the manufacture of an ophthalmic lens, comprising:

at least 20% by weight based on the total weight of the composition of at least one allyl monomer or oligomer selected from diethylene glycol bis(allyl carbonate), ethylene glycol bis(allyl carbonate), oligomers of diethylene glycol bis(allyl carbonate), oligomers of ethylene glycol bis(allyl carbonate), and mixtures thereof;

at least one catalyst suitable for initiating the polymerization of said allyl monomer or oligomer;

at least one UV absorber;

at least one anti-yellowing additive, wherein said anti-yellowing additive corresponds to general formula (I):

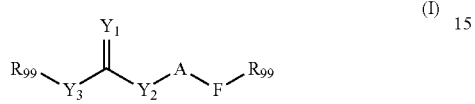

(I)

wherein:

F represents a function selected from sulfide, disulfide or a substituted piperidinyl group;

A is a bond or represents a linear or branched $C_1$-$C_{10}$ alkylene group, wherein 1 to 4 non adjacent carbon atom(s) may independently be replaced by an oxygen atom, a sulphur atom or an amino group, and may comprise from 1 to 4 carbon-carbon double bond(s);

$Y_3$—$C(Y_1)$—$Y_2$ is a polar group in which:
  $Y_1$ represents O or S;
  $Y_2$ and $Y_3$ are similar or different and represent O, S, NH or a bond;

$R_{99}$ is any group, which may include at least one function F and/or at least one polar group as defined hereinabove.

2. The polymerizable composition according to claim 1, wherein $Y_1$ is O.

3. The polymerizable composition according to claim 1, wherein the molecular weight of the anti-yellowing additive divided by the number of $Y_3$—$C(Y_1)$—$Y_2$ polar groups of the anti-yellowing additive is in the range of about 75 g/mol to about 1000 g/mol.

4. The polymerizable composition according to claim 1, wherein the anti-yellowing additive is a substituted piperidinyl group having the following formula (VI)

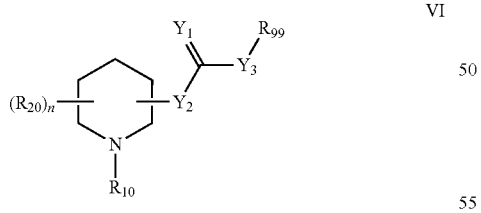

VI wherein:

$R_{10}$ represents a group selected from H, —$R_a$, aryl, —XH, —C(X)—$R_a$, —C(X)—Y—$R_a$ and —($R_e$)—Z, in which:

$R_a$ represents a linear or branched $C_1$-$C_{20}$ alkyl group, or a linear or branched $C_2$-$C_{20}$ alkenyl group;

aryl represents a monocyclic or bicyclic $C_6$-$C_{14}$ hydrocarbyl group, which may optionally be substituted with 1 to 4 substituents independently selected from halogen, linear or branched $C_1$-$C_8$ alkyl, linear or branched $C_1$-$C_8$ alkoxy, linear or branched $C_1$-$C_8$ alkylthio, amino, linear or branched $C_1$-$C_8$ monoalkylamino, and linear or branched $C_1$-$C_8$ dialkylamino;

X represents oxygen or sulphur atom;

Y represents oxygen atom, sulphur atom or a group —$NR_b$ wherein $R_b$ represents hydrogen atom or a linear or branched $C_1$-$C_{20}$ alkyl group;

$R_e$ represents a linear or branched $C_1$-$C_{20}$ alkylene group, wherein 1 to 4 non adjacent carbon atom(s) may independently be replaced by an oxygen atom, a sulphur atom or an amino group —$NR_b$ as defined above, and may comprise from 1 to 4 carbon-carbon double bond(s); and Z represents a hydrogen atom or an aryl group as defined above;

$R_{20}$ represents a group selected from linear or branched $C_1$-$C_8$ alkyl, linear or branched $C_2$-$C_8$ alkenyl, linear or branched $C_1$-$C_8$ alkoxy, linear or branched $C_1$-$C_8$ alkylthio, and —($R_e$)—Z wherein $R_e$ and Z are defined as hereinbefore;

n is an integer from 1 to 4 inclusive;

$Y_1$ represents O or S;

$Y_2$ and $Y_3$ are similar or different and represent O, S, NH or a bond; and $R_{99}$ is any group.

5. The polymerizable composition according to claim 4, wherein $R_{99}$ is a group selected from linear or branched $C_1$-$C_8$ alkyl, substituted piperidinyl or a linear or branched $C_1$-$C_{10}$ alkylene carrying a —COO—$C_1$-$C_{10}$alkyl or a —COO-(substituted piperidinyl) group.

6. The polymerizable composition according to claim 5, wherein the anti-yellowing additive is a substituted 2,2,6,6-tetramethylpiperidine.

7. The polymerizable composition according to claim 5, wherein the anti-yellowing additive is a compound having the following formula (VII):

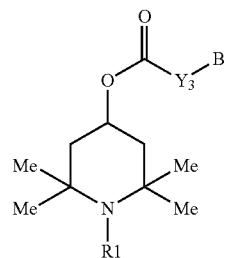

(VII)

wherein:

R1 is hydrogen, linear or branched $C_1$-$C_{15}$ alkyl, linear or branched $C_1$-$C_{15}$ acyl or linear or branched $C_1$-$C_{15}$ alkoxy;

$Y_3$ represents O or a bond;

B is a group selected from linear or branched $C_1$-$C_8$ alkyl, substituted piperidinyl or a linear or branched $C_1$-$C_{10}$ alkylene carrying a —COO-alkyl or —COO-(substituted piperidinyl) group.

8. The polymerizable composition according to claim 1, wherein the anti-yellowing additive corresponds to the following formula (X):

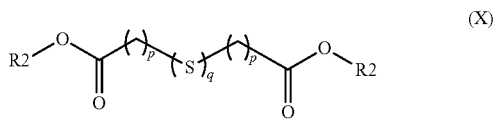

wherein:
- each $R_2$ is independently a linear or branched or cyclic $C_1$-$C_{20}$ alkyl group wherein 1 to 4 non adjacent carbon atom(s) may be replaced by oxygen atom, sulphur atom, and amino group, and may comprise from 1 to 4 carbon-carbon double bond(s);
- each n is an integer from 1 to 17 inclusive; and
- m is 1 or 2.

9. The polymerizable composition according to claim 1, wherein the anti-yellowing additive is a cyclic sulphide having the following formula (XIII)

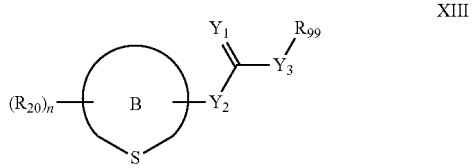

wherein
- $R_{20}$ represents a group selected from linear or branched $C_1$-$C_8$ alkyl, linear or branched $C_2$-$C_8$ alkenyl, linear or branched $C_1$-$C_8$ alkoxy, linear or branched $C_1$-$C_8$ alkylthio, and —$(R_e)$—Z wherein Re represents a linear or branched $C_1$-$C_{20}$ alkylene group, wherein 1 to 4 non adjacent carbon atom(s) may independently be replaced by an oxygen atom, a sulphur atom or an amino group —$NR_b$ wherein $R_b$ represents hydrogen atom or a linear or branched $C_1$-$C_{20}$ alkyl group, and may comprise from 1 to 4 carbon-carbon double bond(s); and
- Z represents a hydrogen atom or an aryl group, wherein aryl represents a monocyclic or bicyclic $C_6$-$C_{14}$ hydrocarbyl group, which may optionally be substituted with 1 to 4 substituents independently selected from halogen, linear or branched $C_1$-$C_8$ alkyl, linear or branched $C_1$-$C_8$ alkoxy, linear or branched $C_1$-$C_8$ alkylthio, amino, linear or branched $C_1$-$C_8$ monoalkylamino, and linear or branched $C_1$-$C_8$ dialkylamino;
- n is an integer from 1 to 5 inclusive;
- B represents a 3 to 12-membered monocyclic heterocycloalkyl which comprises, in addition to the sulphur atom of the cycle, from 1 to 3 heteroatoms independently selected from oxygen and sulphur;
- $Y_1$ represents O or S;
- $Y_2$ and $Y_3$ are similar or different and represent O, S, NH or a bond; and
- $R_{99}$ is any group.

10. The polymerizable composition according to claim 1, comprising:

a mixture of an anti-yellowing additive of formula (VII):

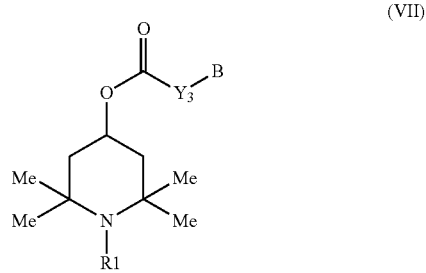

wherein:
- R1 is hydrogen, linear or branched $C_1$-$C_{15}$ alkyl, linear or branched $C_1$-$C_{15}$ acyl or linear or branched $C_1$-$C_{15}$ alkoxy;
- $Y_3$ represents O or a bond;
- B is a group selected from linear or branched $C_1$-$C_8$ alkyl, substituted piperidinyl or a linear or branched $C_1$-$C_{10}$ alkylene carrying a —COO-alkyl or —COO-(substituted piperidinyl) group; and an anti-yellowing additive of formula (X):

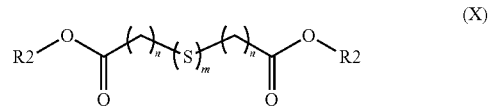

wherein:
- each R2 is independently a linear or branched or cyclic $C_1$-$C_{20}$ alkyl group wherein 1 to 4 non adjacent carbon atom(s) may be replaced by oxygen atom, sulphur atom, and amino group, and may comprise from 1 to 4 carbon-carbon double bond(s);
- each n is an integer from 1 to 17 inclusive; and
- m is 1 or 2.

11. The polymerizable composition according to claim 1, wherein the UV-absorber is a benzotriazole, a benzophenone, a triazine, an oxalanilide, and mixtures thereof.

12. The polymerizable composition according to claim 1, wherein the catalyst is diisopropyl peroxydicarbonate.

13. The polymerizable composition according to claim 1, wherein the catalyst represents from 1.0 to 5.0% by weight based on the total weight of the composition.

14. The polymerizable composition according to claim 1, wherein the catalyst represents from 2.5 to 4.5% by weight based on the total weight of the composition.

15. The polymerizable composition according to claim 1, wherein the anti-yellowing additive represents from 0.05 to 1% by weight based on the total weight of the composition.

16. An ophthalmic lens obtained by filling the composition according to claim 1 in a mould and then heating it, wherein it has a Yellow Index lower than or equal to 2.0, as measured immediately after manufacture.

17. The ophthalmic lens according to claim 16, wherein it has a Yellow Index lower than or equal to 1.7, as measured immediately after manufacture.

18. The ophthalmic lens according to claim 17, wherein the variation in the Yellow Index after exposing said lens to UV light for 80 h does not exceed 0.5 in absolute value.

19. An ophthalmic lens obtained by filling in a mould then polymerizing:
- at least 20% by weight based on the total weight of the composition of at least one allyl compound selected from diethylene glycol bis(allyl carbonate), ethylene glycol bis(allyl carbonate), oligomers of diethylene glycol bis(allyl carbonate), oligomers of ethylene glycol bis(allyl carbonate), and mixtures thereof;
at least one catalyst suitable for initiating the polymerization of said allyl compound;
at least one UV absorber; and
at least one anti-yellowing additive;
wherein said ophthalmic lens has a Yellow Index lower than or equal to 2.0, as measured immediately after manufacture and wherein the variation in the Yellow Index after exposing said lens to UV light for 80 h does not exceed 0.5 in absolute value.

20. A polymerizable composition for the manufacture of an ophthalmic lens, comprising:
at least one allyl monomer or oligomer;
at least one catalyst suitable for initiating the polymerization of said allyl monomer or oligomer;
at least one UV absorber; and
at least one anti-yellowing additive selected from:
a dialkyl thiodipropionate corresponding to formula (XXIa) or a dialkyl 3,3'-dithiodipropionate corresponding to formula (XXIb):

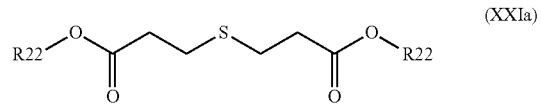
(XXIa)

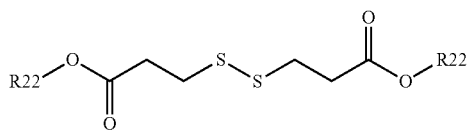
(XXIb)

wherein each R22 is methyl, ethyl, ethyl-hexyl or octyl; or
a dialkyl thiodiglycolate corresponding to formula (XXIIa) or a dialkyl dithiodiacetate corresponding to formula (XXIIb):

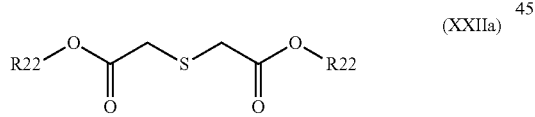
(XXIIa)

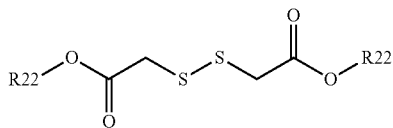
(XXIIb)

wherein each R22 is independently methyl, ethyl, ethyl-hexyl or octyl; or
a cyclic sulphide having the following formula (XIII):

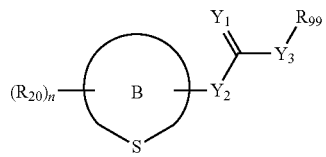
XIII wherein
$R_{20}$ represents a group selected from linear or branched $C_1$-$C_8$ alkyl, linear or branched $C_2$-$C_8$ alkenyl, linear or branched $C_1$-$C_8$ alkoxy, linear or branched $C_1$-$C_8$ alkylthio, and —($R_e$)—Z wherein Re represents a linear or branched $C_1$-$C_{20}$ alkylene group, wherein 1 to 4 non adjacent carbon atom(s) may independently be replaced by an oxygen atom, a sulphur atom or an amino group —$NR_b$ wherein $R_b$ represents hydrogen atom or a linear or branched $C_1$-$C_{20}$ alkyl group, and may comprise from 1 to 4 carbon-carbon double bond(s); and
Z represents a hydrogen atom or an aryl group, wherein aryl represents a monocyclic or bicyclic $C_6$-$C_{14}$ hydrocarbyl group, which may optionally be substituted with 1 to 4 substituents independently selected from halogen, linear or branched $C_1$-$C_8$ alkyl, linear or branched $C_1$-$C_8$ alkoxy, linear or branched $C_1$-$C_8$ alkylthio, amino, linear or branched $C_1$-$C_8$ monoalkylamino, and linear or branched $C_1$-$C_8$ dialkylamino;
n is an integer from 1 to 5 inclusive;
B represents a 3 to 12-membered monocyclic heterocycloalkyl which comprises, in addition to the sulphur atom of the cycle, from 1 to 3 heteroatoms independently selected from oxygen and sulphur;
$Y_1$ represents O or S;
$Y_2$ and $Y_3$ are similar or different and represent O, S, NH or a bond; and
$R_{99}$ is any group.

* * * * *

UNITED STATES PATENT AND TRADEMARK OFFICE
CERTIFICATE OF CORRECTION

PATENT NO. : 10,370,520 B2  
APPLICATION NO. : 15/319260  
DATED : August 6, 2019  
INVENTOR(S) : Pierre Fromentin Page 1 of 1

It is certified that error appears in the above-identified patent and that said Letters Patent is hereby corrected as shown below:

Claim 8, Column 25, Line 1:

Delete " 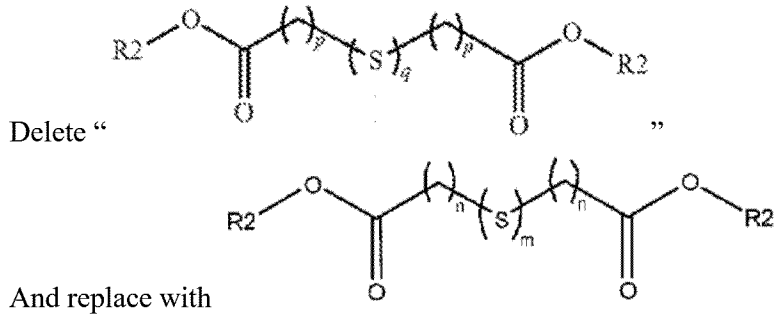 "

And replace with

Signed and Sealed this  
Tenth Day of December, 2019

Andrei Iancu  
*Director of the United States Patent and Trademark Office*